(12) United States Patent
Izutsu (10) Patent No.: US 10,295,027 B2
(45) Date of Patent: May 21, 2019

(54) POWER TRANSMISSION ROLLER ASSEMBLY

(71) Applicant: NTN CORPORATION, Osaka (JP)

(72) Inventor: Tomoyoshi Izutsu, Shizuoka (JP)

(73) Assignee: NTN Corporation, Osaka (JP)

(*) Notice: Subject to any disclaimer, the term of this patent is extended or adjusted under 35 U.S.C. 154(b) by 181 days.

(21) Appl. No.: 15/522,534

(22) PCT Filed: Oct. 23, 2015

(86) PCT No.: PCT/JP2015/079943
§ 371 (c)(1),
(2) Date: Apr. 27, 2017

(87) PCT Pub. No.: WO2016/068035
PCT Pub. Date: May 6, 2016

(65) Prior Publication Data
US 2017/0314653 A1    Nov. 2, 2017

(30) Foreign Application Priority Data

Oct. 31, 2014 (JP) ................................. 2014-222530

(51) Int. Cl.
*F16H 13/14* (2006.01)
*F02B 67/04* (2006.01)
(Continued)

(52) U.S. Cl.
CPC .............. *F16H 13/14* (2013.01); *F02B 67/04* (2013.01); *F16H 13/04* (2013.01); *F16H 55/32* (2013.01)

(58) Field of Classification Search
CPC .......... F16H 13/14; F16H 13/04; F16H 55/32; F16H 29/18; F16H 2007/0806;
(Continued)

(56) References Cited

U.S. PATENT DOCUMENTS

| | | | | |
|---|---|---|---|---|
| 982,104 A | * | 1/1911 | Tarrisse | F16H 13/14 476/48 |
| 990,844 A | * | 5/1911 | Covert | G11B 19/265 476/66 |

(Continued)

FOREIGN PATENT DOCUMENTS

| | | | | |
|---|---|---|---|---|
| DE | 1030132 B | * | 5/1958 | F16H 13/14 |
| DE | 103 01 758 | | 8/2004 | |

(Continued)

OTHER PUBLICATIONS

International Search Report dated Jan. 19, 2016 in corresponding International (PCT) Application No. PCT/JP2015/079943.
(Continued)

*Primary Examiner* — William Kelleher
*Assistant Examiner* — Gregory Robert Weber
(74) *Attorney, Agent, or Firm* — Wenderoth, Lind & Ponack, L.L.P.

(57) ABSTRACT

A power transmission roller assembly includes a power transmission roller configured to be brought into contact with the driving roller and the driven roller, a pivot shaft fixed to a vehicle body, a pivot arm arranged radially inside of the power transmission roller and pivotally mounted on the pivot shaft, and a roller support bearing rotatably supporting the power transmission roller. A pair of biasing members are mounted to the pivot arm and bias the roller support bearing to a predetermined position between the driving roller and the driven roller such that the abutment force between the driving roller and the power transmission roller is balanced with the abutment force between the driven roller and the power transmission roller. Sliding members are mounted on respective shafts of the biasing members to extend through the sliding members, and fric- (Continued)

tional forces are generated between the sliding members and the respective shafts.

12 Claims, 8 Drawing Sheets

(51) Int. Cl.
*F16H 13/04* (2006.01)
*F16H 55/32* (2006.01)

(58) Field of Classification Search
CPC ............... F16H 7/0827; F16H 7/0838; F16H 2007/084; F16H 7/08; F16H 55/56; F16H 55/54; F02B 67/04
USPC ..... 476/65, 66; 474/111, 112, 117, 118, 119, 474/125, 135, 110; 192/45.018, 45.008, 192/18 R
See application file for complete search history.

(56) References Cited

U.S. PATENT DOCUMENTS

| | | | | |
|---|---|---|---|---|
| 1,806,984 A | * | 5/1931 | Prout | ............... F16H 13/14 476/49 |
| 1,870,421 A | | 8/1932 | Prout | |
| 2,031,319 A | * | 2/1936 | Kahn | ............... F16H 7/0827 16/107 |
| 5,931,759 A | * | 8/1999 | Otaki | ............... B62M 6/40 475/183 |
| 6,955,621 B2 | * | 10/2005 | Wigsten | ............... F16H 7/0848 474/110 |
| 8,888,467 B2 | * | 11/2014 | Nakamura | ............... F04D 13/021 417/319 |
| 2005/0181901 A1 | | 8/2005 | Shin et al. | |
| 2005/0215392 A1 | * | 9/2005 | Wimmer | ............... F01P 5/12 476/28 |
| 2005/0255962 A1 | | 11/2005 | Maeda et al. | |
| 2006/0054374 A1 | | 3/2006 | Wimmer et al. | |
| 2008/0184832 A1 | | 8/2008 | Persiani | |
| 2008/0293529 A1 | | 11/2008 | Di Giacomo et al. | |

FOREIGN PATENT DOCUMENTS

| | | | | |
|---|---|---|---|---|
| FR | 2884886 A1 | * | 10/2006 | ............ F16H 13/14 |
| JP | 51-26819 | | 7/1976 | |
| JP | H04-37007 A | * | 12/1992 | |
| JP | 6-74311 | | 3/1994 | |
| JP | 8-277896 | | 10/1996 | |
| JP | 9-296859 | | 11/1997 | |
| JP | 2004-44731 | | 2/2004 | |
| JP | 4809341 | | 11/2011 | |
| JP | 4891914 | | 3/2012 | |
| WO | 2004/048758 | | 6/2004 | |
| WO | 2004/079225 | | 9/2004 | |

OTHER PUBLICATIONS

International Preliminary Report on Patentability dated May 2, 2017 in corresponding International (PCT) Application No. PCT/JP2015/079943.

Extended European Search Report dated Sep. 8, 2017 in European Application No. 15855296.8.

* cited by examiner

FIG. 8B ical FIELD

POWER TRANSMISSION ROLLER ASSEMBLY

TECHNICAL FIELD

The present invention relates to a power transmission roller assembly arranged between a driving roller and a driven roller so as to transmit the rotational force of the driving roller to the driven roller by frictional force.

BACKGROUND ART

In a conventional power transmission mechanism for an engine, through an engine accessory belt trained around an idler pulley, power is transmitted from the crankshaft of the engine to an engine accessory such as a water pump (WP) or an idling stop generator (ISG). In this case, the engine accessory always rotates while the crankshaft is rotating. This means that the water pump is rotated even when it does not need to be rotated such as while the engine is being rotated for warm-up. This leads to the wear of the accessory belt, and to the increase of fuel consumption resulting, e.g., from the unnecessary rotation of the pulley.

In order to overcome this problem, as illustrated in FIG. 1 of Japanese Patent No. 4891914, it is known to use, instead of the accessory belt, an idler roller (friction wheel 17) arranged between a driving roller (crankshaft pulley 4) and a driven roller (friction pulley 14) so as to transmit the rotational force of the driving roller to the driven roller due to the frictional forces between the idler roller and the respective driving and driven rollers. Unlike the engine accessory belt, the idler roller can selectively come into contact with and separate from the driving roller and the driven roller by moving back and forth.

A mechanism (cam actuator) configured to move the idler roller back and forth so as to uniformly bring the idler roller into abutment with the driving roller and the driven roller is now described with reference to FIG. 1 of Japanese Patent No. 4809341. The cam actuator illustrated in FIG. 1 of JP 4809341 includes a planetary speed reducer R for reducing the rotation of a motor 1, and an eccentric cam 3 for converting the reduced rotation of the motor 1 into the reciprocating motion of a coupling rod 201, thereby moving, back and forth, a pulley 300 supported at an end of the coupling rod 201. By moving the pulley 300 back and forth according to the operating conditions of the engine, it is possible to control the transmission and stop of power from the driving roller to the driven roller, and thus to improve fuel economy.

The coupling rod 201 is configured to be slightly pivotable from the axial direction at its intermediate portion. Since the coupling rod 201 is pivotable in this way, when the pulley 300 abuts against the driving roller and the driven roller, the coupling rod 201 pivots such that the abutment force between the pulley 300 and the driving roller is substantially equal to the abutment force between the pulley 300 and the driven roller, thereby positioning the pulley 300 at the optimum position.

The cam actuator according to Japanese Patent No. 4809341 is configured to grip the rotary shaft of the pulley 300 (idler roller) and pivot the rotary shaft about a point located outside of the pulley 300 (substantially at the longitudinal center of the coupling road 201). Therefore, an extra space is necessary around the pulley 300 in which the pulley 300 can pivot. Such an extra space makes it difficult to make the power transmission mechanism small-sized, and to freely lay out the power transmission mechanism. Since the pulley 300 is positioned by pivoting the single coupling rod 201, the coupling rod 201 might be twisted about its axis. This tends to cause the pulley 300 to be brought into abutment with the driving roller and the driven roller in an undesirable manner such that power cannot be transmitted stably due to friction.

Moreover, the driving and driven rollers may not have a complete circular shape. If the driving and driven rollers do not have a complete circular shape, resonance or self-excited vibration is likely to occur as the driving and driven rollers rotate. Therefore, it is impossible to stably keep the pulley 300 in contact with the driving and driven rollers, and thus to stably transmit power from the driving roller to the driven roller.

It is an object of the present invention to provide a power transmission roller assembly capably of stably transmitting power between a driving roller and a driven roller of a power transmission mechanism due to the friction therebetween, and to make the power transmission mechanism small-sized.

SUMMARY OF THE INVENTION

In order to achieve the above object, the present invention provides a power transmission roller assembly arranged between a driving roller and a driven roller so as to transmit a rotational force of the driving roller to the driven roller due to a frictional force, characterized in that the power transmission roller assembly comprises: a power transmission roller retained by a receiving member, and configured to be brought into and out of contact with the driving roller and the driven roller; a pivot shaft fixed to a vehicle body; a pivot arm arranged radially inside of the power transmission roller, and pivotally mounted on the pivot shaft; a roller support bearing rotatably supporting the power transmission roller; a pair of biasing members including, respectively, shafts fixed to the pivot arm, and elastic members each arranged coaxially with a corresponding one of the shafts and biasing the receiving member such that the receiving member is moved away from the pivot arm, the biasing members biasing the roller support bearing to a predetermined position between the driving roller and the driven roller such that an abutment force between the driving roller and the power transmission roller is balanced with an abutment force between the driven roller and the power transmission roller; and sliding members mounted on the respective shafts such that the shafts extend through the sliding members, the sliding members being kept in abutment with the receiving member due to biasing forces of the elastic members, wherein the sliding members are configured such that by the biasing forces of the elastic members, and a reaction force applied from the receiving member in a direction opposed to a direction of the biasing forces of the elastic members when the receiving member is displaced toward the pivot arm, the sliding members are pressed in opposed axial directions of the shafts, and deformed toward the shafts such that frictional forces are generated between the sliding members and the respective shafts.

With this arrangement, when the driving roller and the driven roller abut against the power transmission roller, in accordance with the abutment forces applied to the power transmission roller from the driving roller and the driven roller, respectively, the pair of elastic members are compressed and expanded independently of each other so that the pivot arm pivots about the pivot shaft. When the pivot arm pivots about the pivot shaft, the pivot arm is displaced to the position corresponding to the positions of the respective driving and driven rollers such that the abutment force between the driving roller and the power transmission roller is substantially equal to the abutment force between the driven roller and the power transmission roller. With the pivot arm kept at this position, it is possible to stably transmit power from the driving roller to the driven roller through the power transmission roller.

By arranging the pivot arm radially inside of the power transmission roller, the pivot shaft around which the pivot arm pivots, and the roller support bearing are also arranged radially inside of the power transmission roller. Therefore, the power transmission roller assembly including such a pivot mechanism can be made small-sized. Moreover, since the power transmission roller assembly includes two biasing members, the biasing members are less likely to be twisted when the power transmission roller biases the driving and driven rollers. As a result thereof, the power transmission roller can be reliably brought into abutment with both the driving roller and the driven roller, and thus can stably transmit power from the driving roller to the driven roller due to the friction between the power transmission roller and the respective driving and driven rollers. Moreover, since the roller support bearing can be provided between the two biasing members, the roller support bearing can rotate in a stable manner.

Since the sliding members are mounted on the respective shafts, when the power transmission roller moves toward the driving roller and the driven roller (i.e., when the receiving member moves away from the pivot arm), the direction of the biasing force of each elastic member is the same as that of the force applied to the receiving member. Therefore, axially pressing forces opposed to each other are hardly applied to each sliding member, and thus the sliding members are deformed toward the shafts to a small degree, so that frictional forces are hardly generated between the sliding members and the respective shafts. Therefore, it is possible to quickly move the power transmission roller toward the driving and driven rollers, and bring the power transmission roller into abutment with the driving and driven rollers.

On the other hand, when the power transmission roller moves away from the driving roller and the driven roller (i.e., when the receiving member is pushed toward the pivot arm), each sliding member receives the biasing force of the corresponding elastic member, and the reaction force to the biasing force from the receiving member in the direction opposed to the direction of the biasing force. These two forces, which are axially opposed to each other, press the sliding members, thereby deforming the sliding members toward the shafts to a large degree, and increasing the frictional forces between the sliding members and the respective shafts. Therefore, when a force is applied to move the power transmission roller away from the driving and driven rollers, the sliding members act as dampers, i.e., slow down the movement of the power transmission roller.

Since the sliding members act as dampers, for example, even if the driving and driven rollers do not have a complete circular shape, and thus resonance or self-excited vibration occurs as the driving and driven rollers rotate, it is possible to stably keep the power transmission roller in contact with the driving and driven rollers, and thus to reliably transmit power from the driving roller to the driven roller through the power transmission roller.

Preferably, the power transmission roller assembly are configured such that surfaces of the respective sliding members abutting against the receiving member comprise inclined surfaces each inclined with respect to an axial direction of a corresponding one of the shafts, and surfaces of the receiving member abutting against the respective sliding members comprise inclined surfaces each having a same inclination angle as an inclination angle of the inclined surface of a corresponding one of the sliding members.

By bringing the inclined surfaces of the sliding members into abutment with the respective inclined surfaces of the receiving member in this way, the sliding members can be deformed toward the shafts more easily, so that frictional forces can be generated quickly between the shafts and the respective sliding members. Therefore, it is possible to reliably prevent the power transmission roller from separating from the driving roller and the driven roller, and thus to effectively transmit power from the driving roller to the driven roller through the power transmission roller. By suitably changing the inclination angles of these inclined surfaces, it is possible to adjust the damper forces and thus to reliably reduce the vibration of the power transmission roller while ensuring the smooth movement of the power transmission roller.

It is preferable that surfaces of the sliding members kept in sliding contact with the respective shafts are made of a resin.

If the surfaces of the sliding members kept in sliding contact with the respective shafts are made of a resin, it is possible to stabilize the frictional resistance between the shafts and the respective sliding members, and thus to smoothly move the power transmission roller toward and away from the driving and driven rollers. The sliding surfaces of the sliding members may be coated with a resin or the composition of a resin and another material. The sliding members per se may be made of a resin or the composition of a resin and another material.

Each of the sliding members may include a cutout in a circumferential portion of the sliding member such that the sliding member has a C-shaped cross-section. Alternatively, each of the sliding members may comprise a plurality of circumferentially divided sliding member portions.

By, as descried above, forming a cutout in each sliding member or forming each sliding member from the above-described divided portions, even if the sliding member is made of a material, such as resin or metal, that is less likely to deform even when receiving a biasing force from the elastic member, and a reaction force from the receiving member, it is possible to smoothly generate a frictional force between the shaft and the sliding member. The shape of the cutout and the number of the circumferentially divided sliding member portions may be suitably modified/altered, if it is possible to generate a frictional force between each sliding member and the corresponding shaft.

Effects of the Invention

The power transmission roller assembly according to the present invention comprises: a power transmission roller configured to be brought into contact with a driving roller and a driven roller; a pivot shaft fixed to a vehicle body; a pivot arm arranged radially inside of the power transmission roller, and pivotally mounted on the pivot shaft; a roller support bearing rotatably supporting the power transmission roller; a pair of biasing members mounted to the pivot arm, and biasing the roller support bearing to a predetermined position between the driving roller and the driven roller such that an abutment force between the driving roller and the power transmission roller is balanced with an abutment force between the driven roller and the power transmission roller; and sliding members mounted on respective shafts of the biasing members such that the shafts extend through the sliding members, and such that frictional forces are generated between the sliding members and the respective shafts.

When the pivot arm pivots about the pivot shaft in this way, the power transmission roller is positioned to some extent with respect to the driving and driven rollers, and further in accordance with the abutment forces applied to the power transmission roller from the driving roller and the driven roller, respectively, the pair of elastic members are compressed and expanded independently of each other such that the abutment force between the driving roller and the power transmission roller is substantially equal to the abutment force between the driven roller and the power transmission roller. In this way, it is possible to easily and smoothly position the power transmission roller.

By arranging the pivot arm radially inside of the power transmission roller, the pivot shaft around which the pivot arm pivots, and the roller support bearing are also arranged radially inside of the power transmission roller. Therefore, the power transmission roller assembly including such a pivot mechanism can be made small-sized. Moreover, since the power transmission roller assembly includes two biasing members, the biasing members are less likely to be twisted when the power transmission roller biases the driving and driven rollers. As a result thereof, the power transmission roller can be reliably brought into abutment with both the driving roller and the driven roller, and thus stably transmit power from the driving roller to the driven roller due to the friction between the power transmission roller and the respective driving and driven rollers. Moreover, since the roller support bearing can be provided between the two biasing members, the roller support bearing can rotate in a stable manner.

Since the sliding members mounted on the respective shafts act as dampers, even if the driving and driven rollers do not have a complete circular shape, and thus resonance or self-excited vibration occurs as the driving and driven rollers rotate, it is possible to stably keep the power transmission roller in contact with the driving and driven rollers, and thus to reliably transmit power from the driving roller to the driven roller through the power transmission roller.

DETAILED DESCRIPTION OF THE INVENTION

FIGS. 1A to 5 illustrate a power transmission roller assembly 1 according to the embodiment of the present invention. The power transmission roller assembly 1 is arranged between a driving roller D mounted to a crankshaft, etc. and a driven roller S for activating an engine accessory such as a water pump (WP) or an idling stop generator (ISG) so as to transmit the rotational force of the driving roller D to the driven roller S due to frictional force. The power transmission roller assembly 1 includes a power transmission roller 2, a pivot shaft 3, a pivot arm 4, a bearing 5 supporting the power transmission roller 2 (this bearing is hereinafter referred to as the "roller support bearing 5"), a pair of biasing members 6 each having a shaft 6a, and sliding members 9 arranged such that frictional forces are generated between the sliding members 9 and the respective shafts 6a of the biasing members 6. The driving roller D and the driven roller S are used, respectively, as a driven roller and a driving roller when, for example, driving the crankshaft with the idling stop generator.

The power transmission roller 2 is a cylindrical member having a bottom, and configured to be brought into direct contact with the driving roller D and the driven roller S. The surface of the power transmission roller 2 brought into contact with the driving roller D and the driven roller S comprises a knurled surface 2a knurled so as to increase the frictional forces between the power transmission roller 2 and the respective driving and driven rollers D and S (see FIG. 2A). The power transmission roller 2 is formed in its bottom with a plurality of holes 2b, so that the weight of the power transmission roller 2 is reduced. The power transmission roller 2 is formed with a bearing hole 2c extending along the rotation axis of the power transmission roller 2. The power transmission roller assembly 1 further includes a bearing retaining member 7 inserted in the inner race 5a of the roller support bearing 5 (which is a ball bearing in this embodiment) and the bearing hole 2c to fix the inner race 5a to the power transmission roller 2 so that the power transmission roller 2 and the outer race 5b of the roller support bearing 5 are rotatable relative to each other (see FIG. 1B). Since the power transmission roller 2 is rotated together with the inner race 5a, smaller loads are applied to the roller support bearing 5. Therefore, it is possible to extend the service life of the roller support bearing 5.

Figure 1A:
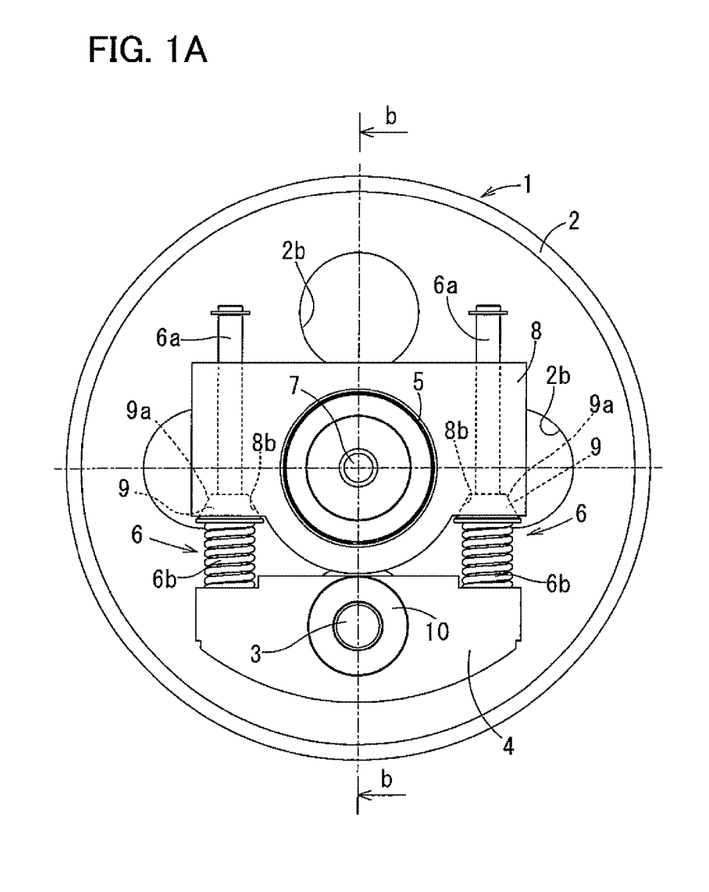
FIG. 1A is a front view of a power transmission roller assembly according to an embodiment of the present invention.
Figure 1B:
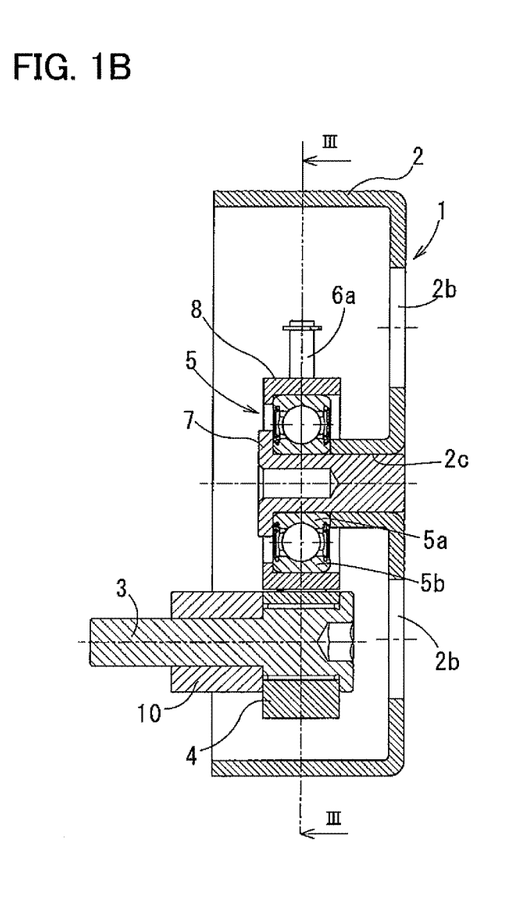
FIG. 1B is a sectional view taken along line b-b of FIG. 1A.
Figure 2A:
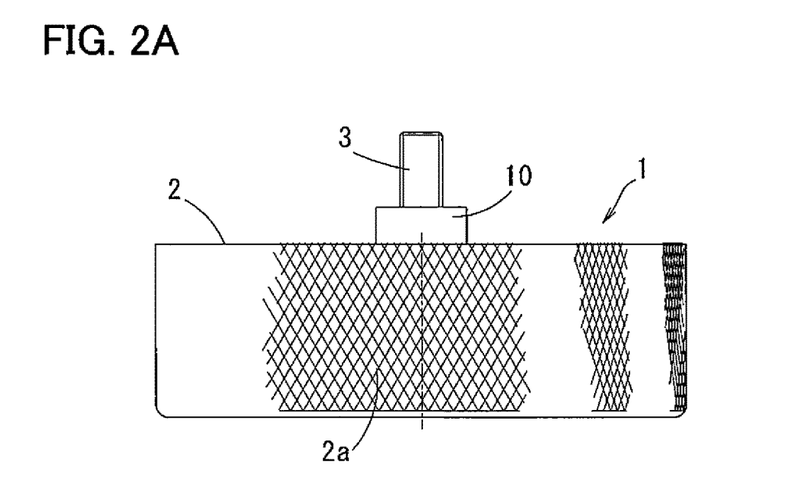
FIG. 2A is a side view of the power transmission roller assembly illustrated in FIG. 1A.
Figure 2B:
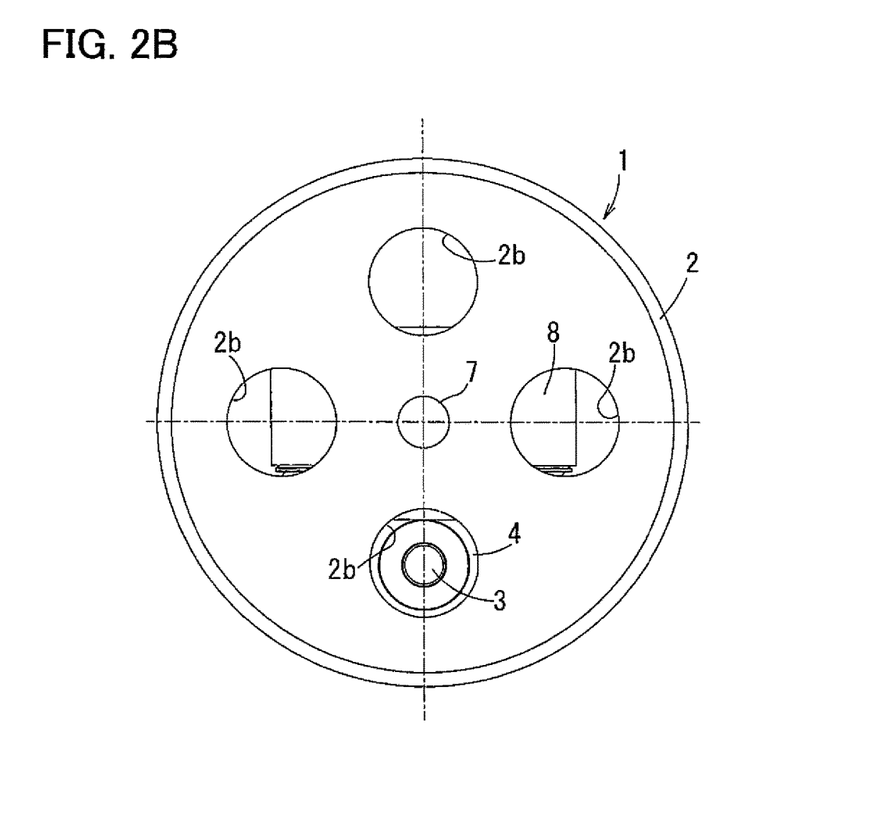
FIG. 2B is a back view of the power transmission roller assembly illustrated in FIG. 1A.
Figure 3:
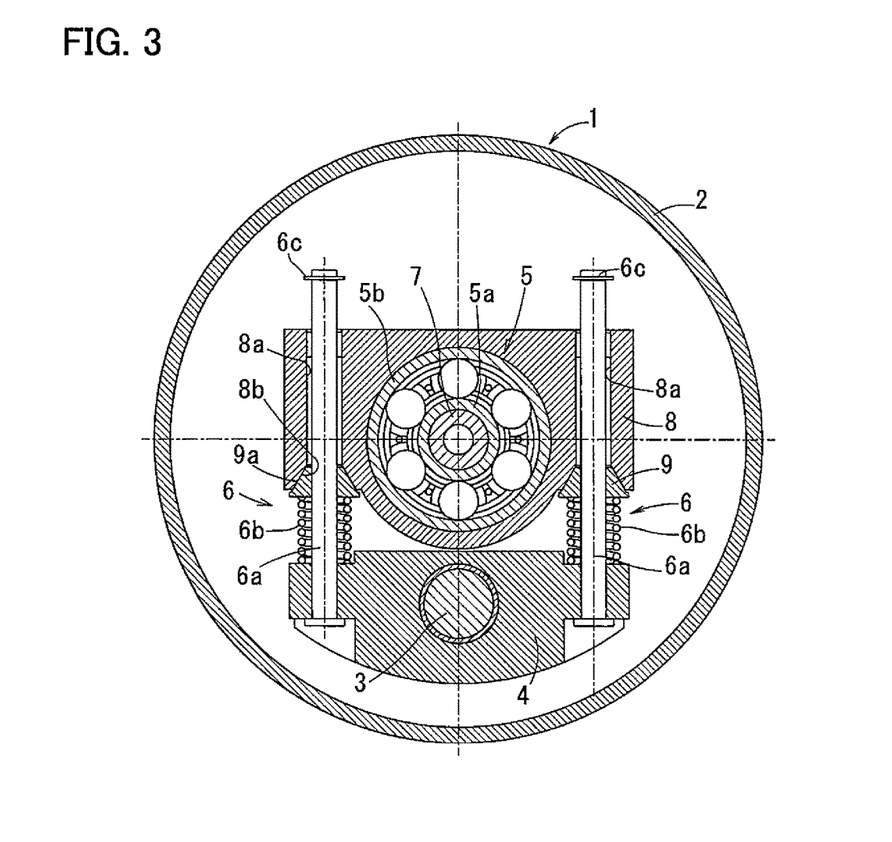
FIG. 3 is a sectional view taken along line of FIG. 1B.
Figure 4:
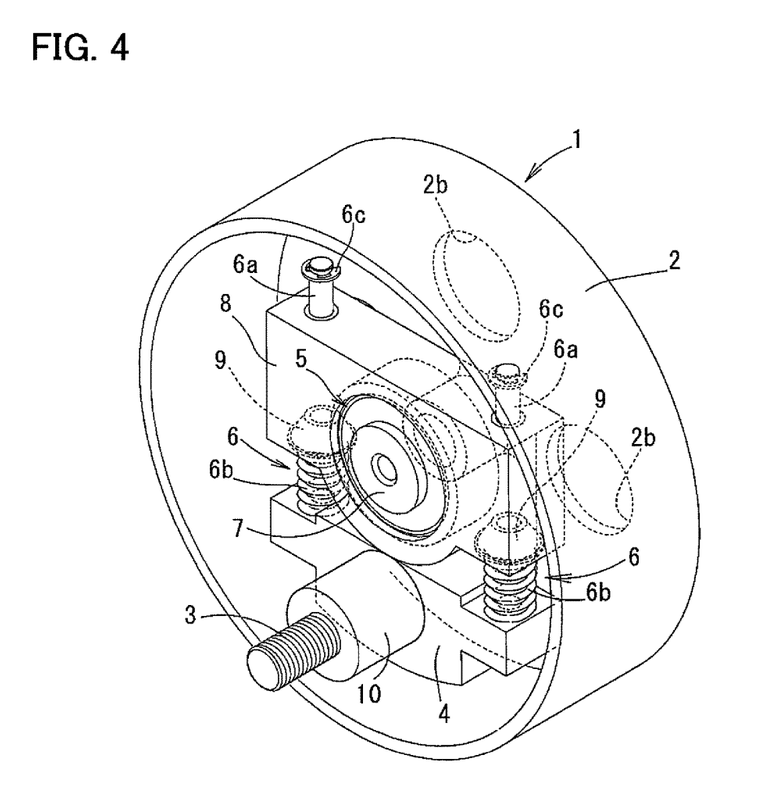
FIG. 4 is a perspective view of the power transmission roller assembly illustrated in FIG. 1A.
Figure 5:
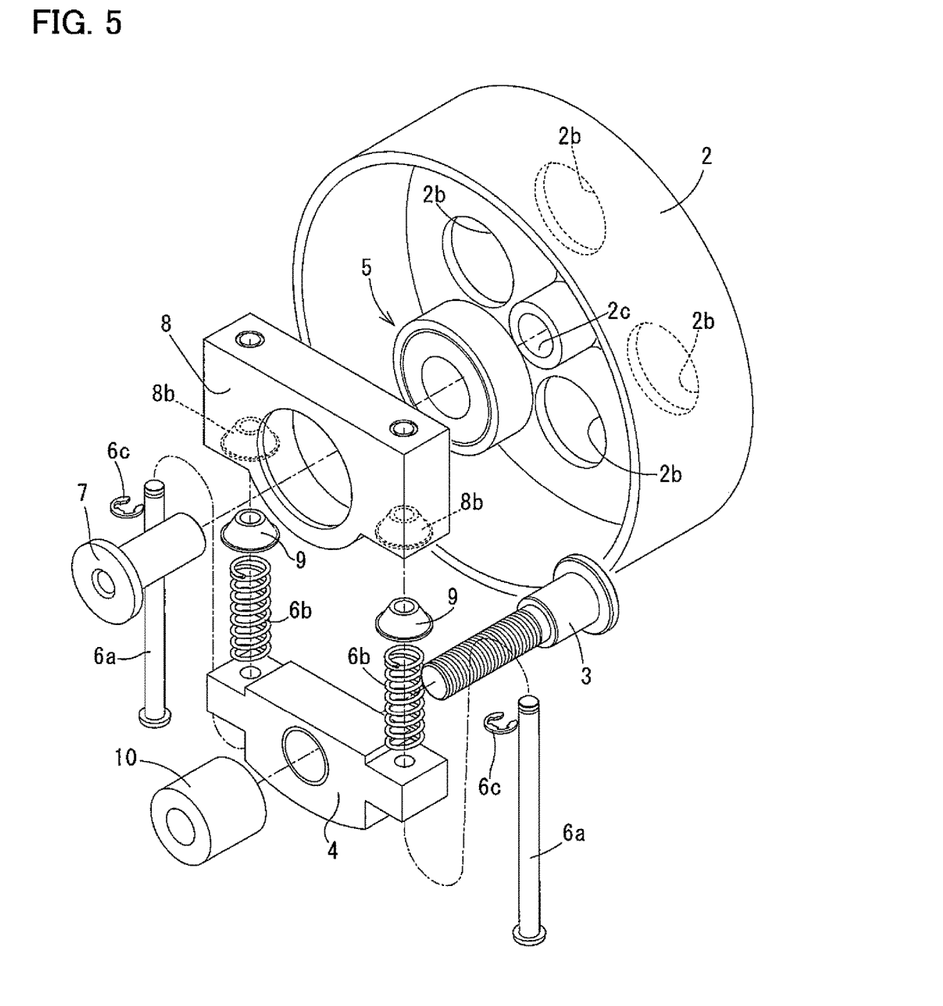
FIG. 5 is an exploded perspective view of the power transmission roller assembly illustrated in FIG. 1A.

The power transmission roller assembly 1 further includes a receiving member 8 fitted on the outer race 5b of the roller support bearing 5, and formed with a pair of through holes 8a arranged to be symmetrical to each other with respect to the roller support bearing 5. The shafts 6a of the biasing members 6 are inserted through the respective through holes 8a with the heads (lower ends in FIG. 3) of the shafts 6a fixed to the pivot arm 4, which is pivotally mounted on the pivot shaft 3. The distal end portions (upper ends in FIG. 3)

of the shafts 6a can protrude from the respective through holes 8a, while being prevented from moving back into the through holes 8a by snap rings 6c.

The biasing members 6 each includes a coil spring 6b (elastic member) arranged coaxially with the corresponding shaft 6a. The biasing members 6 are configured such that when at least one of the driving roller D and the driven roller S abuts against the upper half of the power transmission roller 2 illustrated in FIG. 1A, in accordance with the abutment forces applied to the power transmission roller 2 from the driving roller D and/or the driven roller S, respectively, the two coil springs 6b are compressed and expanded independently of each other such that the pivot arm 4 pivots about the pivot shaft 3 until the power transmission roller 2 abuts against the other of the rollers D and S if the power transmission roller 2 is not initially in abutment with the other of the rollers D and S, and the abutment forces applied from the power transmission roller 2 to the driving roller D and the driven roller S are kept equal to each other.

Since the power transmission roller assembly 1 includes two biasing members 6, the biasing members 6 are less likely to be twisted when the power transmission roller 2 biases the rollers D and S. As a result thereof, the power transmission roller 2 can be reliably brought into abutment with both the driving roller D and the driven roller S, and thus can stably transmit power from the driving roller D to the driven roller S due to the friction between the power transmission roller 2 and the respective driving and driven rollers D and S. Moreover, since the roller support bearing 5 can be provided between the two biasing members 6, the roller support bearing 5 can rotate in a stable manner.

The sliding members 9 are mounted on the respective shafts 6a to be arranged between the receiving member 8 and the coil springs 6b. The surfaces of the respective sliding members 9 abutting against the receiving member 8 comprise inclined surfaces 9a each inclined with respect to the axial direction of the corresponding shaft 6a. The surfaces of the receiving member 8 abutting against the respective sliding members 9 comprise inclined surfaces 8b each having the same inclination angle as that of the inclined surface 9a of the corresponding sliding member 9.

If the sliding members 9 are made of a material having flexibility such as rubber, even if the sliding members 9 have no circumferentially cut portions as in this embodiment, the sliding members 9 can be deformed to such an extent that frictional forces are generated between the sliding members 9 and the shafts 6a. However, if the sliding members 9 are made of a material, such as resin or metal, that is less likely to deform even when receiving biasing forces from the coil springs 6b, or a reaction force from the receiving member 8, it is preferable that a cutout is formed in a circumferential portion of each sliding member 9 such that the sliding member 9 has a C-shaped cross-section, or that the sliding member 9 is circumferentially divided into a plurality of divided portions, namely the sliding member 9 comprises a plurality of circumferentially divided sliding member portions. By forming such a cutout in each sliding member 9, or by forming each sliding member 9 from the above-described divided portions, even if the sliding member 9 is made of a material, such as resin or metal, that is less likely to deform even when receiving a biasing force from the coil spring 6b, and a reaction force from the receiving member 8, it is possible to easily generate a frictional force between the shaft 6a and the sliding member 9.

In this embodiment, the roller support bearing 5 and the biasing members 6 are arranged in the plane passing through the widthwise center of the frictional surface (knurled surface 2a) of the power transmission roller 2. By arranging them in this way, it is possible to prevent moment due to the biasing force generated when the roller support bearing 5 is biased by the biasing members 6, and thus to prevent the inclination of the power transmission roller 2 caused by such moment. Therefore, the power transmission roller 2 of the power transmission roller assembly 1 can be reliably brought into abutment with the driving roller D and the driven roller S, and thus can stably transmit power from the driving roller D to the driven roller S due to the friction between the power transmission roller 2 and the respective driving and driven rollers D and S. It is also possible to prevent wear of the power transmission roller 2 caused by improper abutment of the power transmission roller 2 with the driving roller D and/or the driven roller S.

All of the pivot shaft 3, the pivot arm 4, the roller support bearing 5, and the biasing members 6 are arranged radially inside of the (cylindrical) power transmission roller 2. Therefore, the power transmission mechanism including the power transmission roller assembly 1 can be made small-sized. The power transmission roller assembly 1 is arranged at a predetermined position between the driving roller D and the driven roller S by fixing the pivot shaft 3 through a spacer 10 to a cover (not shown) covering the driving roller D and the driven roller S, and by fitting the cover at a predetermined position. In this case, by providing the power transmission roller assembly 1 with a mechanism (not shown) capable of selectively compressing, and not compressing, the biasing members 6, it is possible to prevent the power transmission roller 2 of the power transmission roller assembly 1 from coming into contact with the driving roller D and the driven roller S when the cover is fitted at a predetermined position, and thus to easily and smoothly mount the power transmission roller assembly 1 at a predetermined position.

While the power transmission roller assembly 1 is mounted to the cover in the above embodiment, if a space for mounting the roller assembly 1 can be obtained on the side of the engine block, the power transmission roller assembly 1 may be mounted to the engine block.

Figure 6:
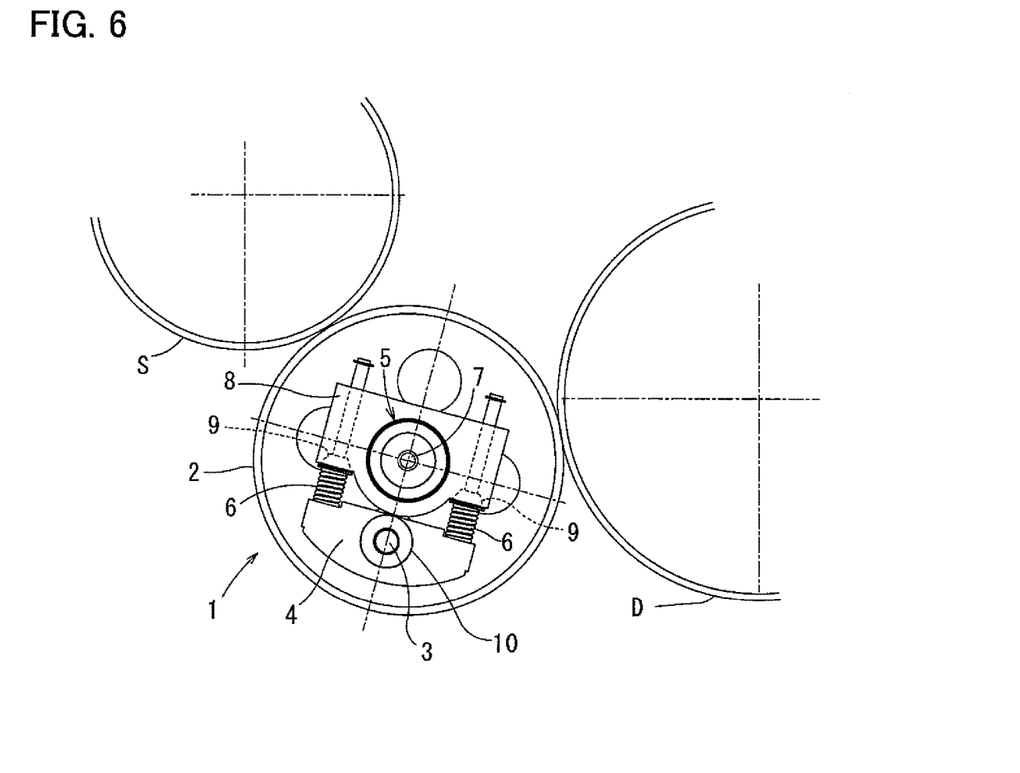
FIG. 6 is a plan view of the power transmission roller assembly illustrated in FIG. 1A, the plan view illustrating the action of the roller assembly.

As described above, when the driving roller D and the driven roller S abut against the power transmission roller 2 of the power transmission roller assembly 1, in accordance with the abutment forces applied to the power transmission roller 2 from the driving roller D and the driven roller S, respectively, the two coil springs 6b are compressed and expanded independently of each other, so that the pivot arm 4 pivots about the pivot shaft 3. When the pivot arm 4 pivots about the pivot shaft 3, as illustrated in FIG. 6, the pivot arm 4 is displaced to the position corresponding to the positions of the respective driving and driven rollers D and S such that the abutment force between the driving roller D and the power transmission roller 2 is substantially equal to the abutment force between the driven roller S and the power transmission roller 2. With the pivot arm 4 kept at this position, the power transmission roller 2 can stably transmit power from the driving roller D to the driven roller S.

Figure 7A:
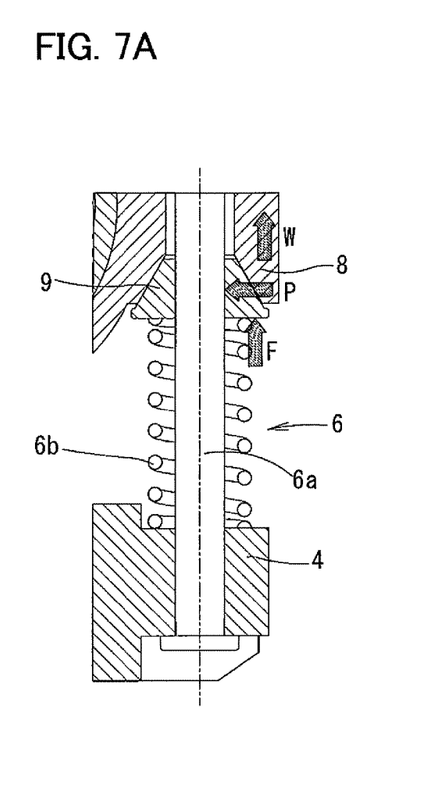
FIG. 7A is a vertical sectional view illustrating damper action in the power transmission roller assembly illustrated in FIG. 1A, specifically, illustrating the state in which components of the roller assembly are acting as dampers due to frictional force.
Figure 7B:
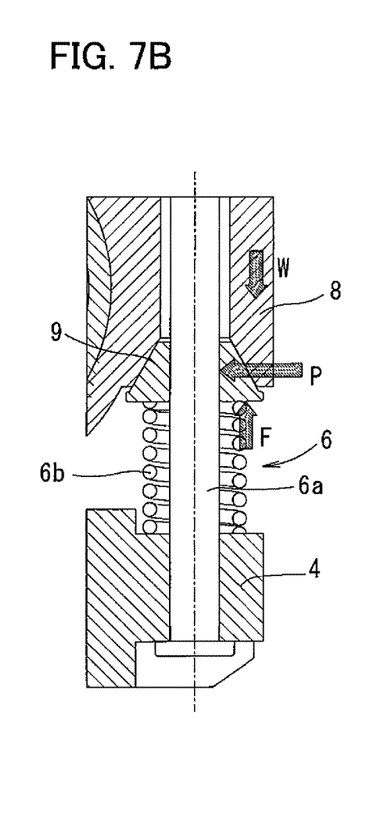
FIG. 7B is a vertical sectional view illustrating damper action in the power transmission roller assembly illustrated in FIG. 1A, specifically, illustrating the state in which components of the roller assembly are not acting as dampers due to small frictional force.

The action of the sliding members 9 as dampers is now described with reference to FIGS. 7A and 7B. When the power transmission roller 2 (and thus the receiving member 8) moves toward the driving roller D and the driven roller S (i.e., when the receiving member 8 moves away from the pivot arm 4), the direction of the biasing force F of each coil spring 6b is the same as that of the force W applied to the receiving member 8 (see FIG. 7B). Therefore, axially pressing forces opposed to each other are hardly applied to each sliding member 9, and thus the sliding members 9 are deformed to a small degree (see the arrow P in FIG. 7B). As a result thereof, frictional forces are hardly generated between the sliding members 9 and the respective shafts 6a. Therefore, it is possible to quickly move the power transmission roller 2 toward the driving and driven rollers D and S, and bring the power transmission roller 2 into abutment with the driving and driven rollers D and S.

On the other hand, when the power transmission roller 2 (and thus the receiving member 8) moves away from the driving roller D and the driven roller S (i.e., when the receiving member 8 is pushed toward the pivot arm 4), each sliding member 9 receives the biasing force F of the corresponding coil spring 6b, and the reaction force W to the biasing force from the receiving member 8 in the direction opposed to the direction of the biasing force F. These two forces, which are axially opposed to each other, press the sliding members 9, thereby deforming the sliding members 9 to a large degree (see the arrow P in FIG. 7A), and increasing the frictional forces between the sliding members 9 and the respective shafts 6a. Therefore, when a force is applied to move the power transmission roller 2 away from the driving and driven rollers D and S, the sliding members 9 act as dampers, i.e., slow down the movement of the power transmission roller 2.

Since the sliding members 9 act as dampers, for example, even if the driving and driven rollers D and S do not have a complete circular shape, and thus resonance or self-excited vibration occurs as the rollers D and S rotate, it is possible to stably keep the power transmission roller 2 in contact with the driving and driven rollers D and S, and thus to reliably transmit power from the driving roller D to the driven roller S through the power transmission roller 2.

Figure 8A:
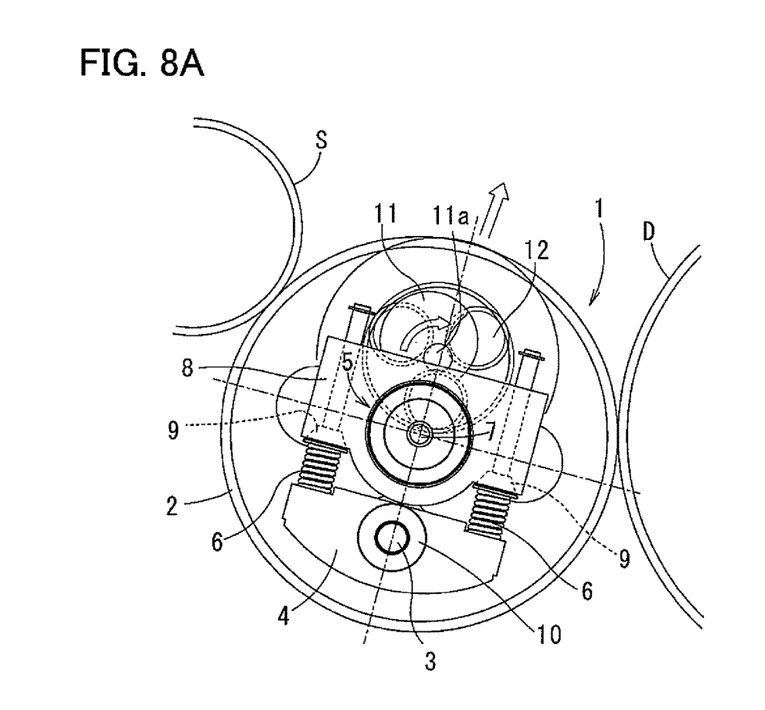
FIG. 8A is a plan view of the power transmission roller assembly provided with an eccentric cam mechanism, the plan view illustrating the state in which power is being transmitted.
Figure 8B:
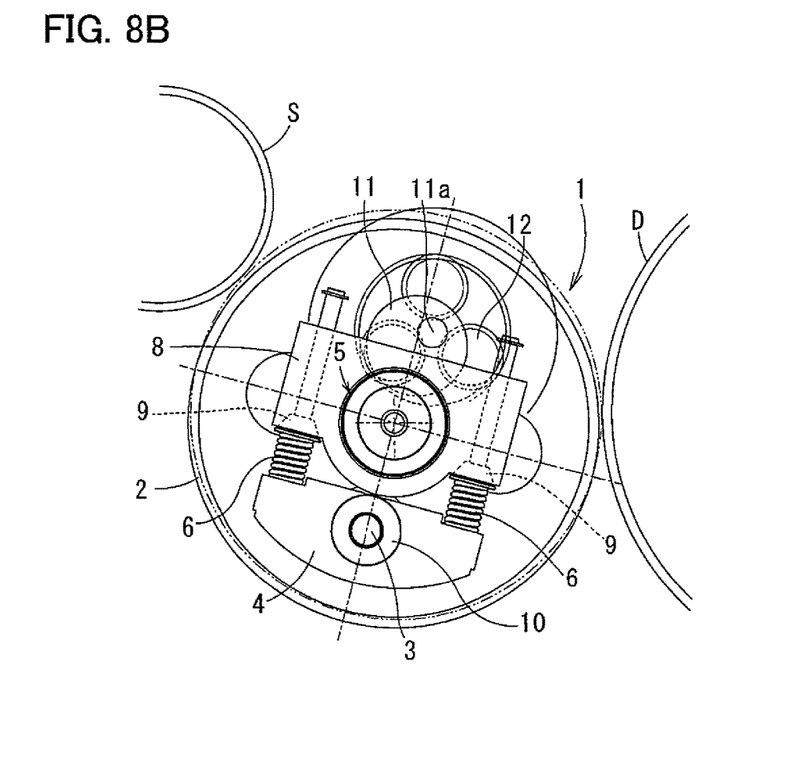
FIG. 8B is a plan view of the power transmission roller assembly provided with an eccentric cam mechanism, the plan view illustrating the state in which no power is being transmitted.

As illustrated in FIGS. 8A and 8B, the power transmission roller assembly 1 may further include, in the vicinity of the roller support bearing 5, an eccentric cam 11 mounted on an eccentric shaft 11a, and pivotable about the eccentric shaft 11a to abut against the roller support bearing 5. The eccentric shaft 11a is connected to a motor (not shown) through a reduction mechanism 12 comprising a planetary gear mechanism, etc. While the eccentric cam 11 is not in abutment with the roller support bearing 5 (see FIG. 8A), the power transmission roller 2 is in abutment with the driving roller D and the driven roller S, so that power is transmitted from the driving roller D to the driven roller S through the power transmission roller 2. On the other hand, when the eccentric cam 11 is brought into abutment against the roller support bearing 5, and pushes the roller support bearing 5 against the biasing forces of the biasing members 6 (such that the biasing members 6 are pushed and compressed), the power transmission roller 2 is separated from the driving roller D and the driven roller S (see FIG. 8B), so that no power is transmitted from the driving roller D to the driven roller S.

By providing the eccentric cam 11, it is possible to easily and smoothly perform and stop the transmission of power from the driving roller D to the driven roller S. Instead of the eccentric cam 11, an actuator may be used which can push the roller support bearing 5 so as to achieve the same results as achieved by the eccentric cam 11. The eccentric cam 11 does not necessarily need to be configured to directly push the roller support bearing 5, and may be configured to push the roller support bearing 5 through a pressing member (not shown) mounted to the roller support bearing 5.

The power transmission roller assembly 1 according to the above embodiment is described as one example. The shapes and arrangements of a component or components constituting the power transmission roller assembly 1 may be modified/altered, or another component or components may be added to the power transmission roller assembly 1, if it is possible to achieve the object of the present invention, that is, if the power transmission roller 2 can stably transmit power from the driving roller D to the driven roller S due to the friction between the roller 2 and the respective rollers D and S, and the power transmission mechanism including the roller assembly 1 is made small-sized.

DESCRIPTION OF REFERENCE NUMERALS

1: power transmission roller assembly
2: power transmission roller
2a: knurled surface
2b: hole
2c: bearing hole
3: pivot shaft
4: pivot arm
5: roller support bearing
5a: inner race
5b: outer race
6: biasing member
6a: shaft
6b: elastic member (coil spring)
6c: snap ring
7: bearing retaining member
8: receiving member
8a: through hole
8b: inclined surface
9: sliding member
9a: inclined surface
10: spacer
11: eccentric cam
11a: eccentric shaft
12: reduction mechanism
D: driving roller
S: driven roller

The invention claimed is:

1. A power transmission roller assembly to be arranged between a driving roller and a driven roller so as to transmit a rotational force of the driving roller to the driven roller due to a frictional force, the power transmission roller assembly comprising:
   a power transmission roller retained by a receiving member, and configured to be brought into and out of contact with the driving roller and the driven roller;
   a pivot shaft to be fixed to a vehicle body;
   a pivot arm arranged radially inside of the power transmission roller, and pivotally mounted on the pivot shaft;
   a roller support bearing rotatably supporting the power transmission roller;
   a pair of biasing members including, respectively, shafts fixed to the pivot arm, and elastic members each arranged coaxially with a corresponding one of the shafts and biasing the receiving member such that the receiving member is moved away from the pivot arm, the biasing members biasing the roller support bearing to a predetermined position between the driving roller and the driven roller such that an abutment force between the driving roller and the power transmission roller is balanced with an abutment force between the driven roller and the power transmission roller; and
   sliding members mounted on the respective shafts such that the shafts extend through the sliding members, the sliding members being kept in abutment with the receiving member due to biasing forces of the elastic members, wherein the sliding members are configured such that, due to the biasing forces of the elastic members, and a reaction force applied from the receiving member in a direction opposed to a direction of the biasing forces of the elastic members when the receiving member is displaced toward the pivot arm, the sliding members are pressed in opposed axial directions of the shafts, and are deformed toward the shafts such that frictional forces are generated between the sliding members and the respective shafts.

2. The power transmission roller assembly according to claim 1, wherein surfaces of the respective sliding members abutting against the receiving member comprise inclined surfaces each inclined with respect to an axial direction of a corresponding one of the shafts, and wherein surfaces of the receiving member abutting against the respective sliding members comprise inclined surfaces each having an inclination angle equal to an inclination angle of the inclined surface of a corresponding one of the sliding members.

3. The power transmission roller assembly according to claim 1, wherein surfaces of the sliding members kept in sliding contact with the respective shafts are made of a resin.

4. The power transmission roller assembly according to claim 1, wherein each of the sliding members includes a cutout in a circumferential portion of the sliding member such that the sliding member has a C-shaped cross-section.

5. The power transmission roller assembly according to claim 1, wherein each of the sliding members comprises a plurality of circumferentially divided sliding member portions.

6. The power transmission roller assembly according to claim 2, wherein surfaces of the sliding members kept in sliding contact with the respective shafts are made of a resin.

7. The power transmission roller assembly according to claim 2, wherein each of the sliding members includes a cutout in a circumferential portion of the sliding member such that the sliding member has a C-shaped cross-section.

8. The power transmission roller assembly according to claim 3, wherein each of the sliding members includes a cutout in a circumferential portion of the sliding member such that the sliding member has a C-shaped cross-section.

9. The power transmission roller assembly according to claim 6, wherein each of the sliding members includes a cutout in a circumferential portion of the sliding member such that the sliding member has a C-shaped cross-section.

10. The power transmission roller assembly according to claim 2, wherein each of the sliding members comprises a plurality of circumferentially divided sliding member portions.

11. The power transmission roller assembly according to claim 3, wherein each of the sliding members comprises a plurality of circumferentially divided sliding member portions.

12. The power transmission roller assembly according to claim 6, wherein each of the sliding members comprises a plurality of circumferentially divided sliding member portions.

* * * * *